(No Model.) 2 Sheets—Sheet 2.
A. F. MACDONALD.
ELECTRIC BRAKE.
No. 567,989. Patented Sept. 22, 1896.
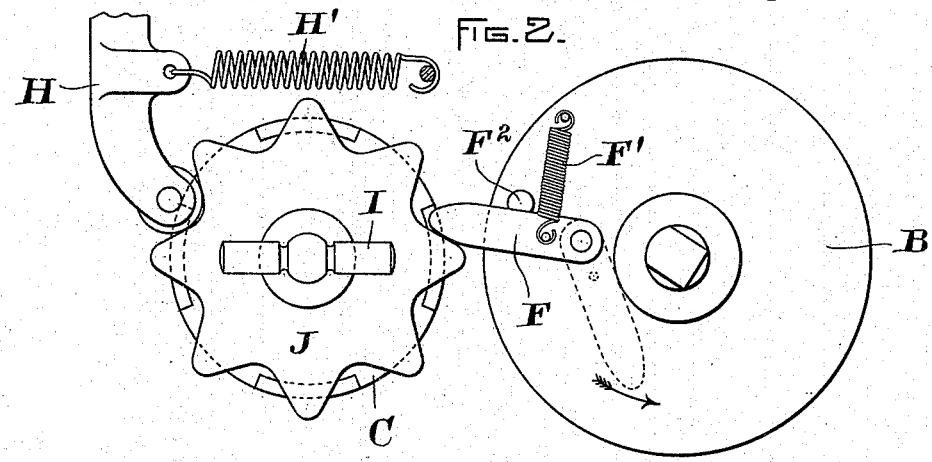
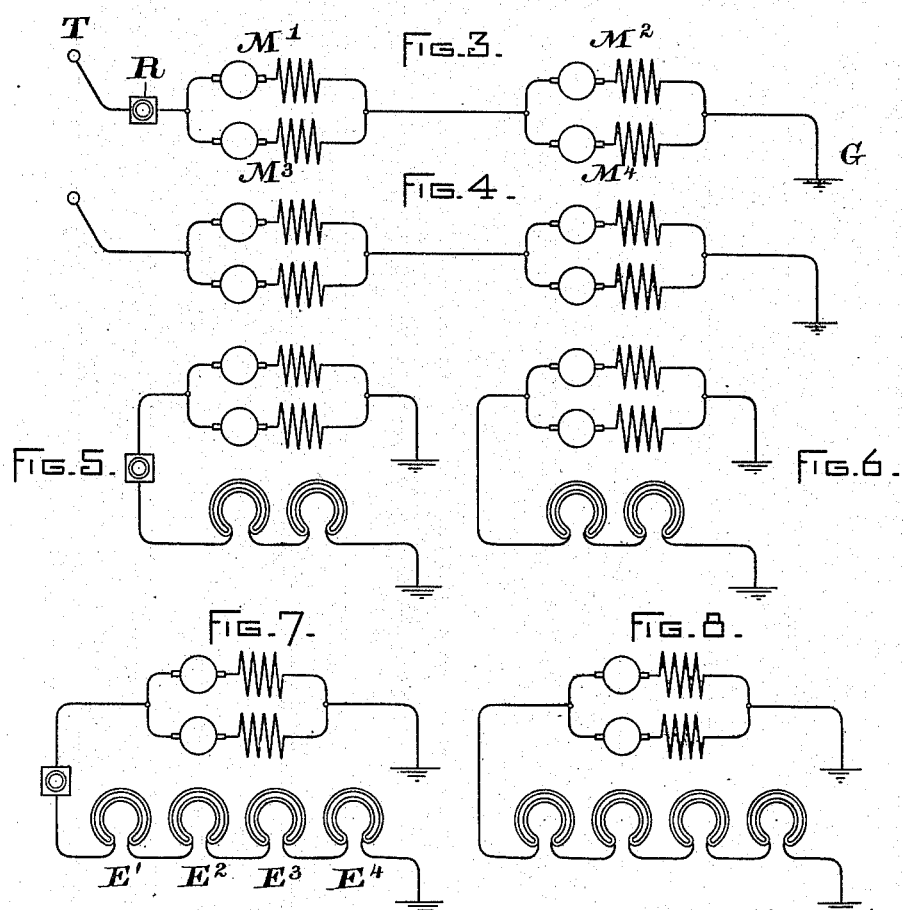
WITNESSES.
A. H. Abell.
B. B. Hill.
INVENTOR.
Alexander F. Macdonald
by Geo. R. Blodgett,
atty.

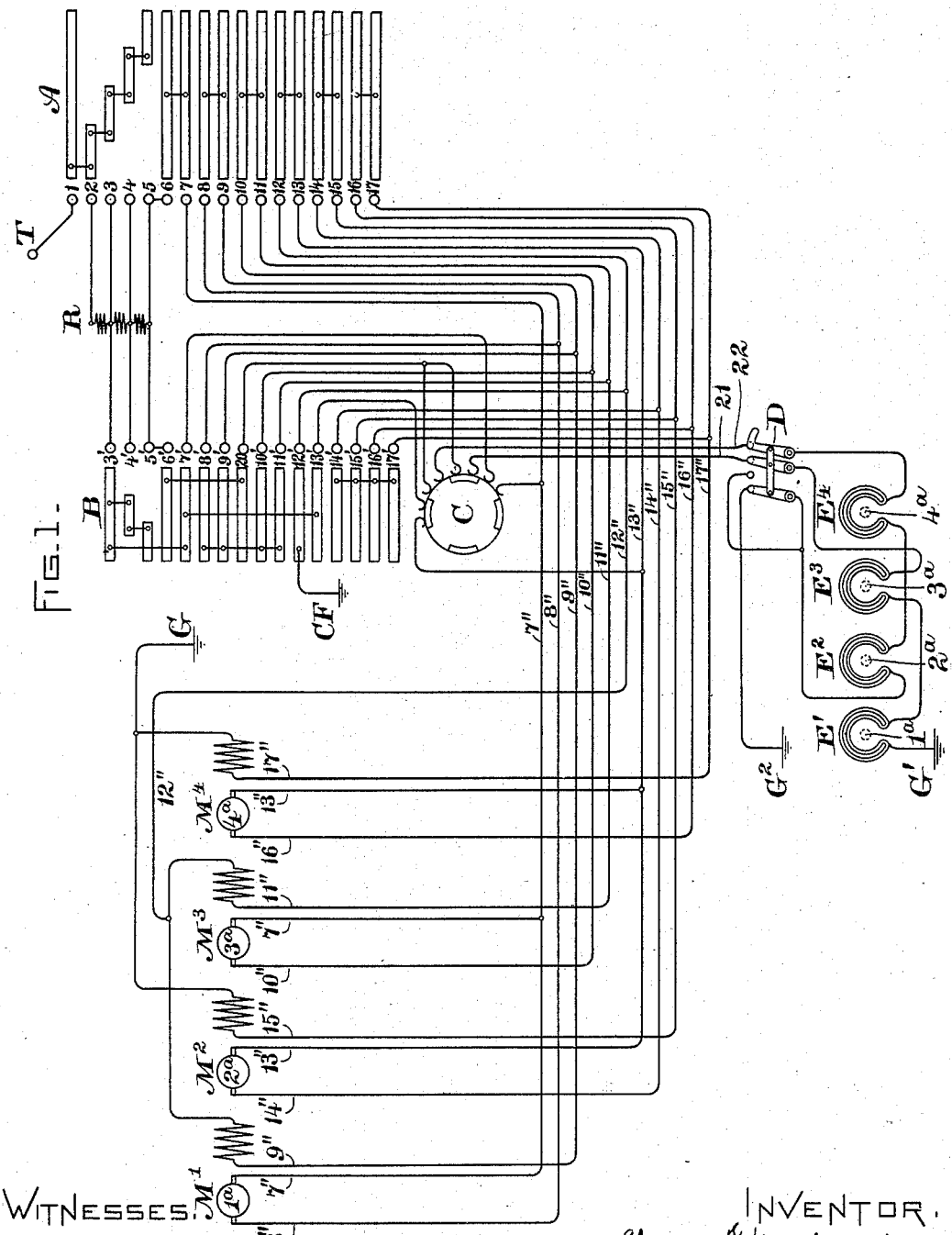

UNITED STATES PATENT OFFICE.

ALEXANDER F. MACDONALD, OF SCHENECTADY, NEW YORK, ASSIGNOR TO THE GENERAL ELECTRIC COMPANY, OF NEW YORK.

ELECTRIC BRAKE.

SPECIFICATION forming part of Letters Patent No. 567,989, dated September 22, 1896.

Application filed April 18, 1896. Serial No. 588,155. (No model.)

*To all whom it may concern:*

Be it known that I, ALEXANDER F. MACDONALD, a citizen of the United States, residing at Schenectady, in the county of Schenectady, State of New York, have invented certain new and useful Improvements in Electric Brakes, (Case No. 364,) of which the following is a specification.

The present invention relates to electric brakes, more particularly when applied to electric locomotives having four or more motors used for propelling and braking purposes, but it is also applicable to vehicles having only two motors.

Motors used both for propelling and braking a vehicle are more subject to heating than those used only for propelling, for the reason that they are in constant or practically constant use, and where the motors would have a chance to cool when the power was off and mechanical brakes applied they now have work to perform in transforming mechanical energy, due to the momentum of the vehicle, into electrical energy.

One object of this invention is to lessen the amount of heating in the motors by giving them a chance to run idle at certain times on the brake side of the system. To attain this end, the motors in a four-motor equipment are arranged to operate in pairs, one of a pair on each truck, for the purpose of distributing the active motors in such a manner as to obtain the greatest tractive effect, the advantages of which are well known. In a two-motor equipment a motor would be mounted on each axle in the ordinary manner.

A suitable controlling mechanism is provided which is adapted to vary the circuit relations of the motors when propelling the vehicle and to vary the resistance of the brake-circuit when the motors are converted into generators and used for braking.

In controllers of existing types used for regulating the power of electric brakes it is necessary to provide extra resistance on the brake side of the system, in order to cut down the current of the generators. The current produced by the motors of a vehicle when operated as generators is much greater than is needed for braking purposes. Instead of inserting extra resistance in the brake side of the system I prefer to cut a part of the motors out of the brake-circuit and use the same or less resistance than that in the power side. This permits the motor or motors cut out of circuit to cool, and by the use of automatic means first one pair of motors and then another is used, or where only two motors are used one motor is used for braking and then the other. This alternation in either case may be effected each time the vehicle is to be stopped or after a number of such stops.

It is preferable to have the switching done automatically each time the vehicle is to be stopped, but it is within the scope of the invention to have this switching done by hand and at whatever interval may be desired. The particular time at which the switching is done, either automatically or by hand, is immaterial.

The invention further relates to the distribution of the electric brakes and motors with respect to one another. Preferably the motors one and three, which form a pair, are mounted on separate trucks, and when used for braking are in circuit with the brakes mounted on the axles carrying motors two and four. This distributes the braking effect over the entire vehicle, the generators acting as brakes on one pair of axles and the brake-magnets on the other.

If at any time the braking effect of the two motors and the two brakes is not enough, a switch is provided, operated by the motorman, to throw more of the brakes into circuit. Ordinarily, however, the extra brakes would not be necessary.

In the accompanying drawings, attached to and made a part of this specification, Figure 1 is a diagrammatic view of a controller embodying the invention. Fig. 2 is a detail view of the automatic switch, and Figs. 3 to 8 are diagrams of connections.

Two sets of contacts A and B are provided. These may be carried by a single cylinder and operated by one handle, or separate cylinders and operating-handles may be provided. In the present instance two separate cylinders are shown. C is the automatic switch, the operation of which will be hereinafter described. Two sets of brushes are shown. Those numbered 1 to 17 are adapted to engage with the contacts on cylinder A to vary the speed of the motors M' M² M³ M⁴ when used for propelling the vehicle, and the brushes 3' to 17', inclusive, and 20 are adapted to engage with the contacts on cylinder B to vary the resistance of the brake-circuit.

It is assumed that the locomotive is provided with two trucks and a motor mounted on each axle, the motors mounted on axles 1ª and 3ª forming one pair and those on axles 2ª and 4ª forming a second pair. The brake-magnets E' E² E³ E⁴ are arranged in like manner. Brakes E' and E³ form a pair and are mounted on the axles with motors M' and M³. Brakes E² and E⁴ also form a pair and are mounted on the axles with motors M² and M⁴. A switch D is provided to connect the brake-magnets in pairs or in series.

Referring to Fig. 2, the operating mechanism for the automatic switch C will be described. Mounted on a disk carried by the cylinder B is an arm F, adapted to be held in the position shown by means of a spring F', the end of the arm engaging with the teeth of the star-wheel J. To regulate the step-by-step movement of the star-wheel, a pawl H and spring H' are used and secured to the back of the controller in any desired manner. The brake-cylinder B is shown in its off position. To operate it, the handle (not shown) would be thrown to the left and the cylinder would move in the direction indicated by the arrow. This would cause the arm F to rotate the star-wheel J and the switch C, attached thereto, through a certain number of degrees. As soon as it had rotated far enough for the roller carried by the pawl H to pass the point of a tooth the switch C would be snapped into place, and a continued movement of the cylinder B would have no effect on it.

The switch-cylinder C is provided with contacts and insulation which alternate with each other in such a manner that in one position of the switch the brake-circuit is closed through one motor or group of motors, and when moved ahead the circuit is closed through another motor or group of motors. The switches are so arranged that the cylinder C establishes its connections before the cylinder B closes the connections through the brakes.

The moving of the handle back to the original position does not change the position of the switch C, for the reason that the arm F is free to move in a direction away from the pin F², which forms a stop when it moves in the opposite direction. A second movement of the handle in the direction of the arrow would, however, cause the cylinder C to rotate and establish new circuit relations. If it is desired to leave the switch C in one position or control it by hand, the arm F is thrown into the position shown in dotted lines, and the spring F' serves to hold it in place.

For the purpose of operating the switch by hand a handle I is secured to the operating-shaft and is preferably outside of the controller-case. One motor or a group of motors can now be used as long as desired. If for any reason one motor or a pair of motors was disabled, it would be necessary to have this switch remain in one position; otherwise the brake-circuit would be thrown upon the inoperative motor or motors.

Referring to Fig. 1, the connections for the circuits will be described. Assume the brushes to be in their first position on the cylinder. The current enters by the trolley T, to brush 1, to the cylinder A, to brush 2, through all the resistance R to brush 5, cross-connected to brush 6, by cylinder A to brush 7, to wire 7. Here the circuit divides, one circuit being to the armature of motor M', thence by wire 8'' to brush 8, by cylinder A to brush 9, by wire 9'' to the field of the motor M', to wire 12''. Going back to the circuit from the brush 7 and wire 7'', the second circuit is formed through the armature of motor M³, to wire 10'', to brush 10, by cylinder A to brush 11, by wire 11'' to the field of motor M³, to wire 12''. Here it unites with the circuit from motor M', passing to brush 12, by the cylinder A to brush 13, to wire 13''. It divides again at this point, one path being by way of wire 13'', armature of motor M², wire 14'', brush 14, cylinder A to brush 15, wire 15'' to the field of motor M² to ground. Going back to the wire 13'' where the circuit divided, the other path is through the armature of motor M⁴, wire 16'', brush 16, by cylinder A to brush 17, wire 17'', to the field of motor M⁴, to ground. The motors are now connected, as shown in Fig. 3, with full resistance in circuit.

A continued rotation of the cylinder A would simply cut the resistance out of circuit and the motors would be connected as shown in Fig. 4. It is to be understood, of course, that any desired connection of the motors could be used, as, for instance, a series-parallel arrangement.

If it was desired to brake the vehicle, the cylinder B would be thrown into engagement with its vertical line of brushes, and, assuming that motors M² and M⁴ are to be used for braking purposes, the switch C being so situated as to close the circuits of these motors, then, with the brushes in the first position on the brake-cylinder, the circuit would be as follows: The current emanating from the armatures of motors M² and M⁴ passes by wires 14'' and 16'' to brushes 14' and 16', to the cylinder B, thence by cross connections to brushes 15' and 17', by wires 15'' and 17'' to the fields of motors M² and M⁴, to ground G, thence to ground G' through the brake-shoes E' E³, to the switch D, by wire 21, through the contact-plate on switch C, to brush 20, cylinder B, by cross connection to brush 6', cross-connected to brush 5', through two sections of resistance R to brush 3', to cylinder B, by cross connection to brush 13', through the contact-plate on switch C to wire 13'', to the negative sides of the armatures of motors M² and M⁴. The motors are now connected with the brake-magnets, as shown in Fig. 5.

A continued movement of the cylinder B would cut out more and more resistance, until finally the circuit relations will be those shown in Fig. 6.

Assuming that the switch C is now rotated by means of the arm F in the manner described above, the motors M' and M³ would be placed in circuit, and the connections would be as follows: The current emanating from the armatures of motors M' and M³ would pass by wires 8" and 10" to brushes 8' and 10', by cross connection to brushes 9' and 11', by wires 9" and 11" to the fields of motors M' and M³, thence by wire 12" to brush 12', cylinder B, to ground C F on the controller-frame, thence by ground G² to the left-hand side of switch D to brake-shoes E² and E⁴, to switch D, to wire 22, through the contact-plate on switch C, to brush 20, to cylinder B, by cross connection to brush 6', cross-connected to 5', through two sections of resistance R to brush 3', cylinder B, cross-connected to brush 7', through the contact on switch C, to the wire 7", to the negative side of the armatures of motors M' and M³. The circuit through the motors is now the same as that shown in Fig. 5, except that motors M' and M³ are used instead of M² and M⁴. A continued movement of the cylinder B would cut out the resistance R and the circuit would be as shown in Fig. 6.

If at any time the braking effect of either the brakes E' E³ or E² E⁴ is not enough, the switch D is thrown to the left. This connects all four brakes in circuit, as shown in Fig. 7. The circuit, assuming motors M' and M³ to be in circuit, would be from the ground C F on the controller-frame, to ground G', ground G² being open-circuited, through brake-magnets E' E² E³ E⁴, to the switch D and through wire 22 to the contact-plate on switch C, the balance of the circuit being the same as before. The right-hand blade of the switch D is made of sufficient width to cover two contacts. This is to complete the circuit through the switch C in case the end of either wire 21 or 22 in on insulation.

Fig. 8 shows the same condition of circuits, except that the resistance R is cut out. The circuits through the motors are the same as before, so that further description is unnecessary.

When a two-motor equipment is used, the motors are alternated with each other for braking purposes, and they are treated in the same manner as the groups of motors explained above.

The invention has been described in connection with a system in which brake-magnets have been employed, this being a common arrangement at the present time, but I do not limit myself to this. The invention applies equally well to systems where the retarding effect of the generators is alone used for braking purposes. I claim, broadly, an electric-brake system in which the generator or generators used for braking purposes are shifted each time a stop is made or after a number of stops. The particular way in which the shifting is done or the number of stops before such change is made is immaterial.

What I claim as new, and desire to secure by Letters Patent of the United States, is—

1. In an electric-brake system, a switch for shifting the dynamo-electric machine or machines employed for braking purposes each time the brake-circuit is closed.

2. In an electric-brake system, an automatic switch for changing the dynamo-electric machine or machines employed for braking purposes, at predetermined intervals, the switch being controlled by the operation of the brake-circuit-closing switch.

3. In an electric-brake system, an automatic switch for changing the dynamo-electric machine or machines employed for braking purposes, the switch operating at the interval between the closing of the brake-circuit for one stop and the closing of the brake-circuit for another stop.

4. In an electric-brake system, the combination of a plurality of dynamo-electric machines for propelling and braking a vehicle, circuits for the machines, and means for shifting the connection of the brake-magnets from one to another of the dynamo-electric machines.

5. In an electric-brake system, a plurality of dynamo-electric machines adapted to propel or brake a vehicle, in combination with means for alternately connecting a part of them to the brake-circuit.

6. In an electric-brake system, the combination of a plurality of dynamo-electric machines for propelling and braking a vehicle, brake-magnets and means for alternately connecting the brake-magnets to the dynamo-electric machines.

7. In an electric-brake system, the combination of a plurality of dynamo-electric machines for propelling and braking a vehicle, brake-magnets, means for closing the circuit between the magnets, and a dynamo-electric machine for one stop or a given number of stops, and means for closing the circuit of the magnets with another dynamo-electric machine for a second stop or a number of stops.

8. In an electric-brake system, the combination of a plurality of dynamo-electric machines adapted to propel or brake a vehicle, means for dividing the dynamo-electric machines into groups, and means for alternately connecting the groups to the brake-magnets.

9. In an electric-brake system, the combination of a plurality of motors for propelling and braking a vehicle, a brake-circuit, a switch for closing the brake-circuit through less than the total number of motors, and means for determining which of the motors shall be in the brake-circuit.

10. In an electric-brake system, the combination of a plurality of motors for propelling and braking a vehicle, power and brake circuits for the motors, and an automatic switching device for shifting the connections of the brake-magnets from one or more dynamo-electric machines to a similar machine or machines.

11. In an electric-brake system, the combination of a dynamo-electric machine for propelling and braking purposes, a resistance adapted to be included in both power and brake circuits, contacts mounted on a cylinder for including the total resistance in circuit with the machine at the time the circuit is completed on the power side of the system, and contacts mounted on a cylinder for closing the circuit through less than the total amount of the resistance at the time the brake-circuit is closed.

12. In an electric-brake system, the combination of a plurality of dynamo-electric machines for propelling and braking a vehicle, a resistance divided into sections and adapted to be included in both power and brake circuits, contacts mounted on a cylinder for including the total resistance in circuit with the machines at the time the circuit is completed on the power side of the system, and contacts mounted on a cylinder for closing the circuit between the brake-magnets and the machines through less than the total amount of resistance at the time the circuit is completed.

13. In an electric-brake system, the combination of dynamo-electric machines used for braking purposes, means for closing the brake-circuit through less than the total number of machines, and means for changing the machines which are used for braking purposes.

14. In an electric-brake system, the combination of dynamo-electric machines used for propelling and braking a vehicle, a switch for closing the brake-circuit through less than the total number of machines, and an automatic switch for changing the machines used for braking purposes.

15. In an electric-brake system, the combination of a plurality of dynamo-electric machines adapted to propel a vehicle, and means for closing the circuit between less than the total number of dynamo-electric machines and the brake-magnets, the magnets thus included in circuit being on axles carrying the idle machines.

16. In an electric-brake system, the combination of a plurality of dynamo-electric machines adapted to propel or brake a vehicle, and automatic means for alternately closing the circuit between groups of the dynamo-electric machines and the brake-magnets, the machines and brake-magnets thus included in circuit being situated on different axles.

17. In an electric-brake system, the combination of a plurality of dynamo-electric machines arranged in groups and adapted to propel or brake a vehicle, an automatic switching device for alternately closing the groups of machines on the brake-circuit, and a switch for including extra brake-magnets in circuit with the machines.

18. In an electric-brake system, the combination of a plurality of dynamo-electric machines supported by separate axles, the machines being divided electrically into groups, brake-magnets supported by the axles, and means for alternately closing the circuit between certain of the dynamo-electric machines and the brake-magnets.

19. In an electric-brake system, the combination of dynamo-electric machines divided into pairs or groups, the machines of each pair or group being mounted on different axles, brake-magnets also mounted on the axles, and means for including the brake-magnets which are mounted on axles provided with idle motors, in circuit with a pair or group of dynamo-electric machines.

20. In an electric-brake system, the combination of a cylinder provided with suitable contacts for regulating the energy supplied to the brakes, and a switch controlled by the brake-cylinder for cutting a machine or group of machines out of circuit.

21. In a controller for an electric-brake system, the combination of motors electrically connected in pairs, a brake-cylinder provided with suitable contacts for varying the connections of the motors when the brake-circuit is closed, and a switching mechanism controlled by the operating mechanism for opening the circuit of one pair of motors when on the brake side.

22. In a controller for electric brakes, the combination of contacts for varying the resistance of the motor-circuit, contacts for varying the energy supplied to the brake-magnets, and means controlled by the operating-handle for alternately including the dynamo-electric machines in circuit with the brake-magnets.

23. In a controller for electric brakes, the combination of a contact-cylinder for regulating the motor-circuit, a contact-cylinder for regulating the amount of energy supplied to the brake-magnets, and an automatic switching device controlled by the brake-cylinder, for alternately including the dynamo-electric machines in circuit with the brake-magnets.

24. In a controller for an electric-brake system, the combination of power and brake cylinders, a plurality of circuits therefor, and a rotary switch operated by the brake-cylinder, for determining which dynamo-electric machines shall be in circuit with the brakes.

25. In a controller for electric brakes, the combination of power and brake cylinders, and a switch actuated in the interval between the time the power-circuit is broken and the brake-circuit established, for determining which dynamo-electric machine shall be in circuit with the brakes.

26. In a controller for electric brakes, the combination of a contact-cylinder for regulating the motor-circuit, a contact-cylinder for varying the energy supplied to the brake-magnets, an automatic switch for including one or another group of dynamo-electric machines with the brake-magnets, and a switch for varying the number of magnets in circuit.

In witness whereof I have hereunto set my hand this 17th day of April, 1896.

ALEXANDER F. MACDONALD.

Witnesses:
    A. H. ABELL,
    B. B. HULL.